US007815043B2

(12) United States Patent
Hawkins et al.

(10) Patent No.: US 7,815,043 B2
(45) Date of Patent: Oct. 19, 2010

(54) LATERALLY FLEXIBLE REINFORCED STRUCTURE

(75) Inventors: John Hawkins, Loganville, GA (US); Geoff Normanton, Dacula, GA (US); Arthur B. Brown, Durango, CO (US)

(73) Assignee: Fenner Dunlop Americas, Inc., Charlotte, NC (US)

( * ) Notice: Subject to any disclaimer, the term of this patent is extended or adjusted under 35 U.S.C. 154(b) by 566 days.

(21) Appl. No.: 11/837,265

(22) Filed: Aug. 10, 2007

(65) Prior Publication Data
US 2008/0035454 A1 Feb. 14, 2008

Related U.S. Application Data

(60) Provisional application No. 60/837,892, filed on Aug. 14, 2006.

(51) Int. Cl.
*B65G 15/34* (2006.01)
(52) U.S. Cl. ...................................................... 198/847
(58) Field of Classification Search ................. 198/847, 198/337
See application file for complete search history.

(56) References Cited

U.S. PATENT DOCUMENTS

| 3,179,238 | A | * | 4/1965 | Patin | 198/835 |
| 3,310,161 | A | * | 3/1967 | Kraft, Jr. | 198/847 |
| 3,633,725 | A | * | 1/1972 | Smith | 198/337 |
| 3,741,837 | A |   | 6/1973 | Marzocchi et al. | |

(Continued)

FOREIGN PATENT DOCUMENTS

JP          02070690 A   *   3/1990

OTHER PUBLICATIONS

International Search Report dated Feb. 21, 2008 for International Patent Application No. PCT/US07/75718, filed on Aug. 10, 2007.

(Continued)

*Primary Examiner*—Mark A Deuble
(74) *Attorney, Agent, or Firm*—Shumaker, Loop & Kendrick, LLP

(57) ABSTRACT

In improved reinforced conveyor belt structure is disclosed having a segmented reinforcing structure for enabling enhanced in-plane expansion of the belt under conditions of extreme in-plane experienced during operation. The belt comprises at least one elastomer layer and at least one reinforcing layer. The reinforcing layer may comprise a continuous strip disposed along the longitudinal center line of the conveyor belt. A series of laterally-extending reinforcing strips are disposed on either side of the center strip, radiating outward toward respective edges of the belt. These laterally-extending strips are spaced apart from one another to form a series of flexibility enhancing gaps therebetween, thus enabling the belt to elongate at its edges without undue restraint from the reinforcing layer. The laterally-extending strips may be oriented perpendicular to the center strip, or they may be oriented at oblique angles with respect to the center strip. The reinforcing layer may comprise one or more plies. Additional light-weight layers of reinforcing material may be provided between the reinforcing layer and the elastomer layer in order to enhance the structural integrity of the belt. In one embodiment, these light-weight reinforcing layers are continuous sheets of non-segmented reinforcing material which extend across substantially the entire width of the belt. Additional layers of elastomer material may be disposed between the reinforcing layer and the light-weight layers.

18 Claims, 9 Drawing Sheets

U.S. PATENT DOCUMENTS

| | | | | |
|---|---|---|---|---|
| 4,064,915 | A | * | 12/1977 | Buyssens et al. ........ 139/425 R |
| 4,216,856 | A | | 8/1980 | Moring et al. |
| 4,776,446 | A | * | 10/1988 | Fisher et al. ................ 198/337 |
| 5,255,772 | A | * | 10/1993 | Ball et al. .................... 198/337 |
| 6,029,801 | A | | 2/2000 | Odin et al. |
| 6,092,645 | A | | 7/2000 | Wahren |
| 6,673,431 | B1 | * | 1/2004 | Ledzinski ................ 428/292.1 |
| 2009/0127067 | A1 | * | 5/2009 | Guo et al. ................... 198/337 |

OTHER PUBLICATIONS

Written Opinion of the International Searching Authority dated Feb. 21, 2008 for International Patent Application No. PCT/US07/75718, filed on Aug. 10, 2007.

* cited by examiner

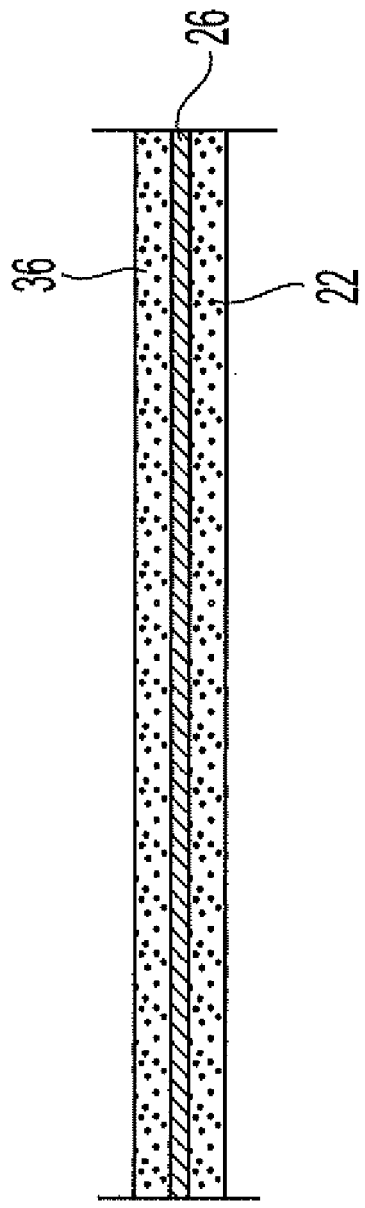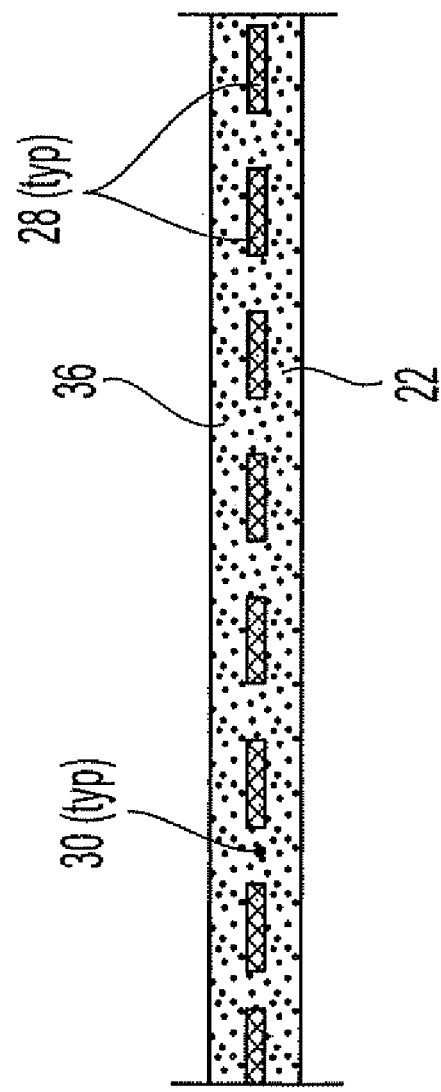

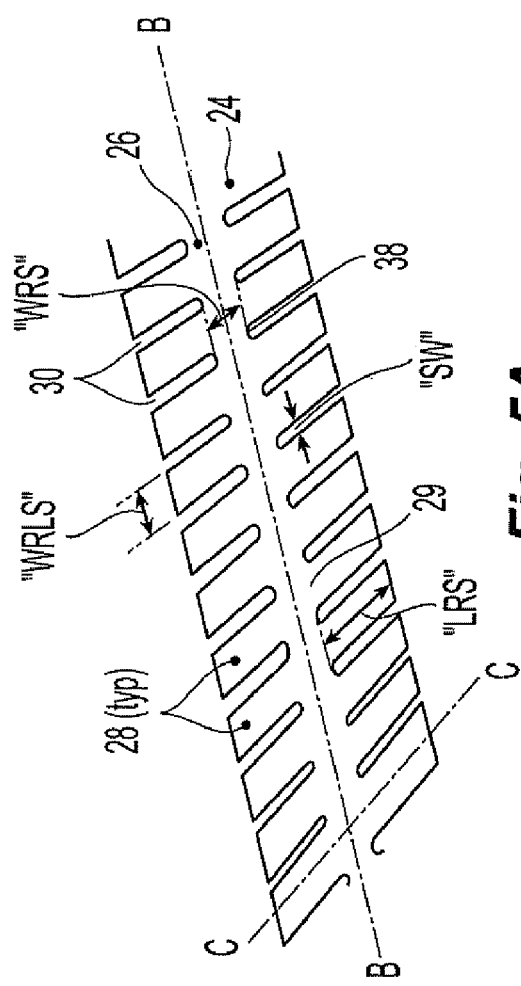
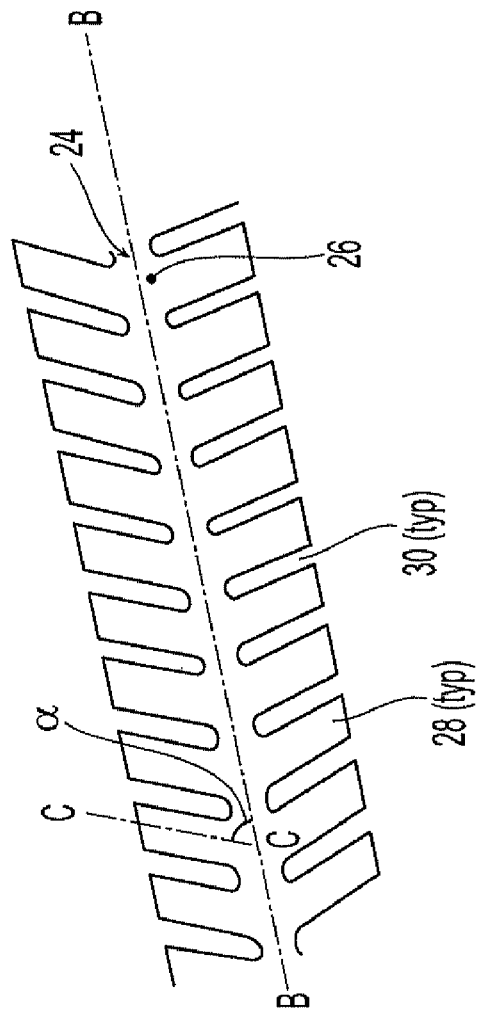

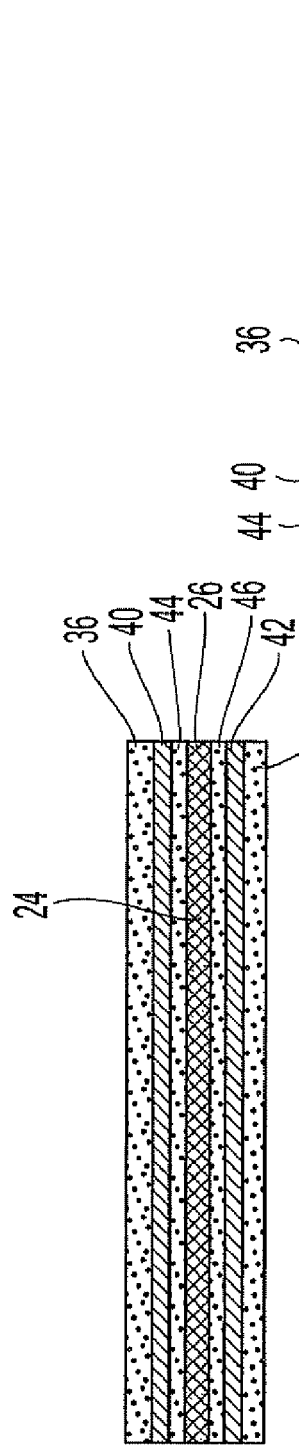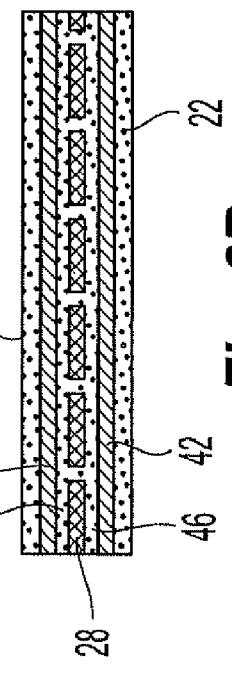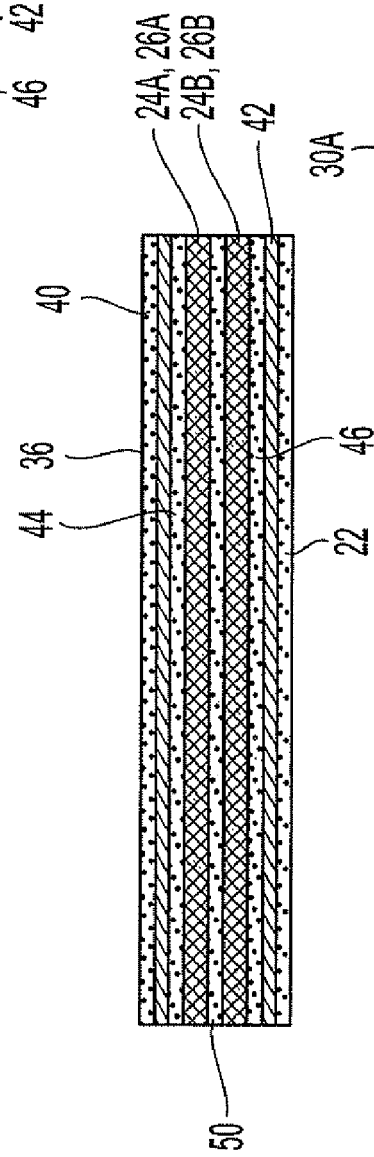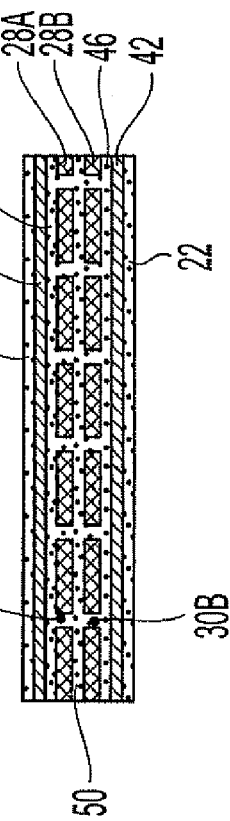
Fig. 6A
Fig. 6B
Fig. 7A
Fig. 7B

LATERALLY FLEXIBLE REINFORCED STRUCTURE

CROSS-REFERENCE TO RELATED APPLICATION

This is a non-provisional of pending U.S. provisional patent application Ser. No. 60/837,892, filed Aug. 14, 2006, by John Hawkins, et al., titled "Laterally Flexible Reinforced Structure," the entirety of which application is incorporated herein by reference.

FIELD OF THE INVENTION

The invention generally relates to reinforced belting structures having substantial in-plane flexibility, and more particularly to reinforced conveyor belt structures capable of withstanding extreme in-plane flexing over an extended period without premature degradation.

BACKGROUND

Conveyor belts and conveyor systems are well known systems used for the transport of a variety of materials and products. In underground mining operations, conveyors are used to transport mined materials from the mining machine to their ultimate transportation location.

A variety of different conveying systems and apparatuses have been developed for transferring the mined material from the mining machine to the main belt conveyors. Flexible or articulated mobile conveyor systems are known. Such articulated systems often used in combination with a mining head referred to as a "continuous miner" to enable continuous transport of mined materials produced by the mining head out of the shaft to a collection facility located above-ground. The continuous miner is located at the forward end of a mine shaft, and depending upon the disposition of the mined material within the ground, the shaft often defines a substantially circuitous path through the earth. The great advantage of the flexible conveyor system is that it can conform to this circuitous path to enable the rapid transport of the mined material up and out of the mine shaft without the need for tag-teaming multiple individual straight conveyor systems.

The flexible conveyor system can operate around 60-degree corners, each with a radius of as little as 28 feet, and at speeds of up to 600 feet per minute The system can advance with the continuous miner to allow for up to about 400 feet of continuous mining development, and with any given advance, the continuous miner may accommodate up to four such bends. The conveyor belt used with the flexible conveyor system is thus subjected to extreme in-plane bending when it traverses these bends. A series of closely-spaced hold down edge rollers are employed to extend over the top of the belt to keep the belt troughed and substantially centered as it moves around the bends. Due to the curved path of travel, the edge rollers exert substantial forces on the belt to maintain it in a desired alignment along its path up through the mine workings.

As a result, belts used in these applications typically have very short life spans. One mode of failure is due to edge wear, in which the intense interaction between the idlers and the belt causes wear at the edges to such a degree that the idlers are no longer able to engage or hold down the belt, thus making it impossible to keep the belt troughed or centered. Another failure mode is tearing across the belt width, which can occur at any point on the belt, but which is often experienced adjacent the mechanical splices.

Current belts used with the flexible conveyor system have rubber covers applied over an aramid (i.e., Kevlar) reinforcing layer, with tire cord material embedded in the cover material in the widthwise direction to provide resistance to fastener pullout. Due to the nature of their construction, these belts are handmade.

Thus, there is a need for an improved conveyor belt design for use with a flexible conveyor system. Such an improved belt should have increased resistance to degradation when subjected to extreme in-plane bending conditions to thereby reduce the total system operational costs associated with belt replacement and attendant system shutdown. Such a conveyor belt design should also be amenable to manufacture by modern automated processes to thereby reduce overall manufacturing costs.

SUMMARY OF THE INVENTION

The disadvantages heretofore associated with the prior art are overcome by the inventive design for a reinforced flexible conveyor belt. The inventive design provides advantages including cost-effectiveness, efficiency, and longer life than previous designs.

A flexible reinforced structure is disclosed, comprising a first elastomeric layer having a surface, and a first reinforcing layer having a first major surface disposed over said surface of said first elastomeric layer. The first reinforcing layer may comprise a central section and a plurality of longitudinally spaced lateral sections having a first end associated with said central section and a second end spaced a distance away from said central section.

A flexible reinforced structure is further disclosed, comprising first and second elastomeric layers and a first reinforcing layer disposed between said first and second elastomeric layers. The first reinforcing layer may have a longitudinally-oriented central section and a plurality of spaced-apart laterally-oriented sections. Each of the laterally-oriented sections may be spaced a distance from immediately adjacent ones of said plurality of laterally-oriented sections as measured along a longitudinal axis of said flexible reinforced structure.

A method of making a flexible reinforced structure is also disclosed. The method may comprise providing first and second elastomeric layers; providing a first reinforcing layer having a central longitudinal section and a plurality of laterally-disposed sections, the central longitudinal section being substantially aligned with a longitudinal axis of said flexible reinforced structure, the plurality of laterally-disposed sections each having an axis that is substantially non-parallel to said longitudinal axis of said flexible reinforced structure; and adhering said first and second elastomeric layers to said first reinforcing layer.

BRIEF DESCRIPTION OF THE DRAWINGS

The details of the invention, both as to its structure and operation, may be obtained by a review of the accompanying drawings, in which like reference numerals refer to like parts, and in which:

FIG. 3A is a cross-section view of the belt of FIG. 2, taken along line 3A-3A;

FIG. 3B is a cross-section view of the belt of FIG. 2, taken along line 3B-3B;

FIG. 5A is a plan view of an exemplary reinforcing layer of the belt of FIG. 2;

FIG. 5B is a plan view of an alternative reinforcing layer for use in the belt of FIG. 2;

FIGS. 6A and 6B are cross-section view of a first alternative embodiment of the belt of FIG. 2, incorporating additional reinforcing layers above and below the central reinforcing layer;

FIGS. 7A and 7B are cross-section views of a second alternative embodiment of the belt of FIG. 2, incorporating a two-ply central reinforcing layer;

DETAILED DESCRIPTION

Figure 1A:
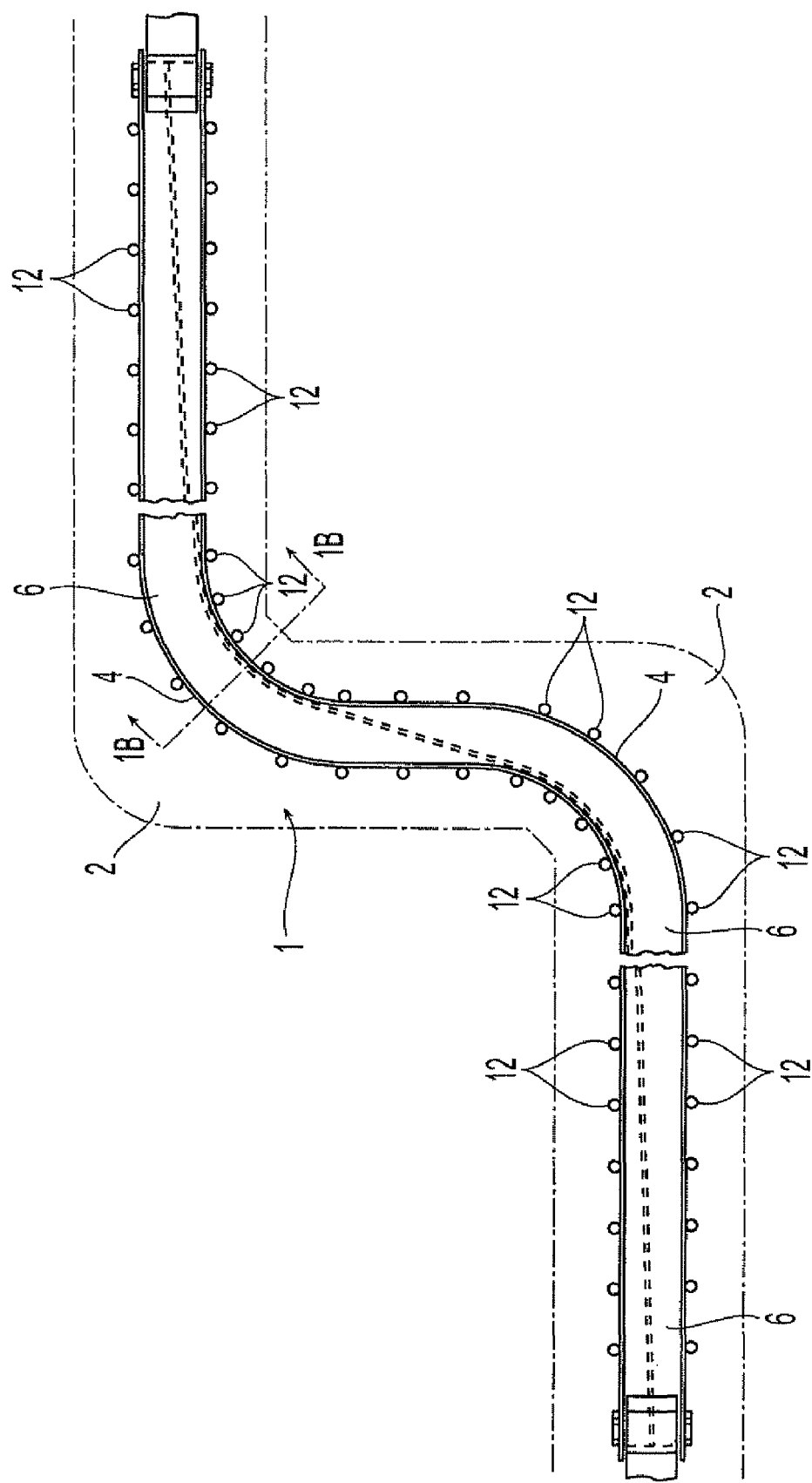
FIG. 1A is an isometric view of a articulated conveyor system.
Figure 1B:
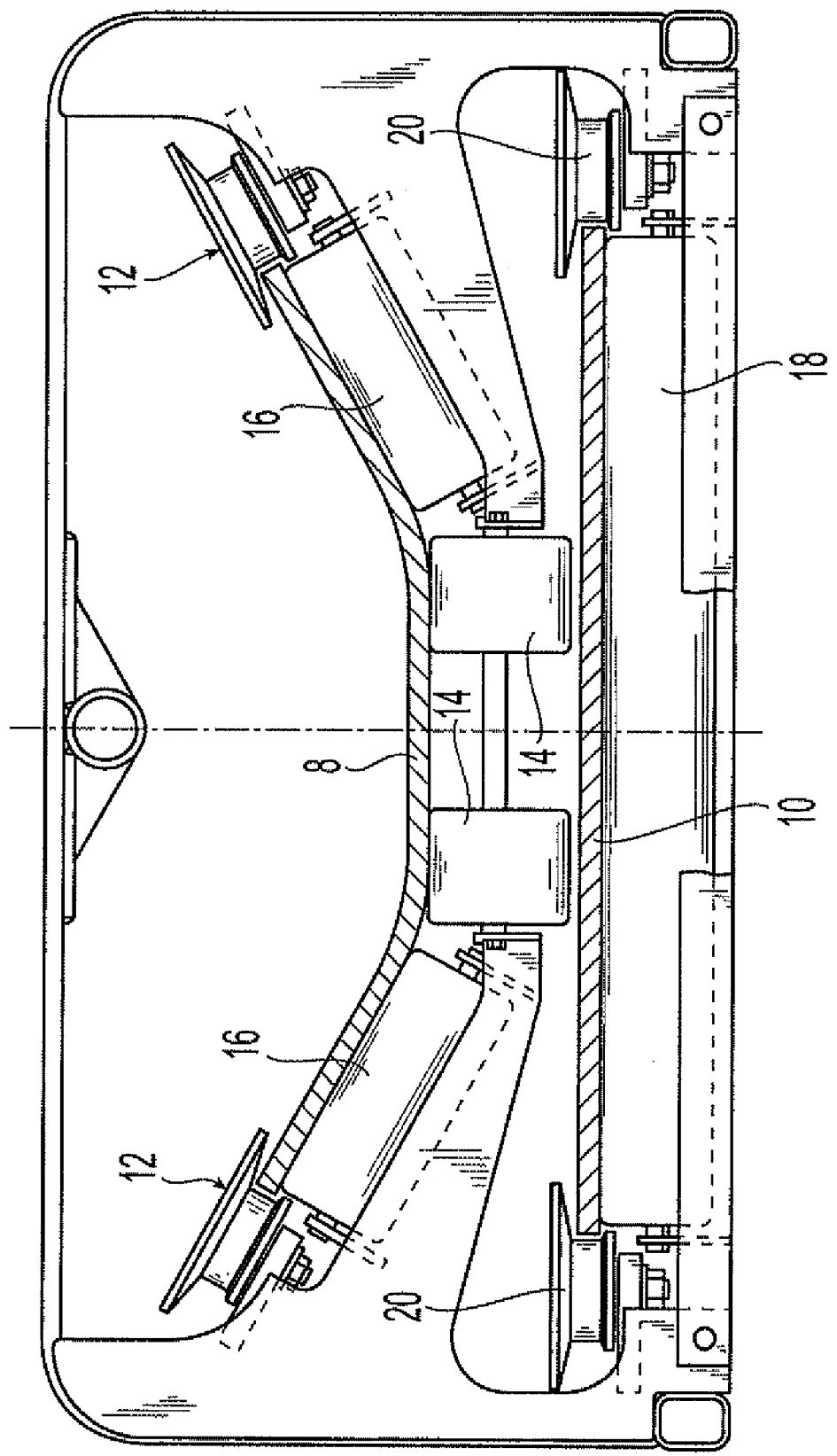
FIG. 1B is cross-section view of a portion of the conveyor system of FIG. 1A, taken along line 1B-1B, showing a supporting idler structure for guiding the conveyor belt along the conveyor system.

Referring to FIG. 1A, a flexible conveyor system 1 is located within a curved passage 2 as can be found in an underground mine for conveying mined materials along the passage 2. The conveyor system 1 extends around bends or curves 4 in the passage 2. The conveyor system 1 may have an endless flexible conveyor belt 6 having an upper conveying run 8 and a lower return run 10 (FIG. 1B). As shown in FIG. 1B, the conveyor system 1 may further comprise a series of edge rollers 12 for guiding the conveying run 8 along its curved path and for holding the edges of the conveying run 8 down on the conveyor system 1. Idler rollers 14 and wing rollers 16 are also shown supporting the conveying run 8. Return run 10 is shown supported by return idler roller 18 and return edge rollers 20.

Figure 2:
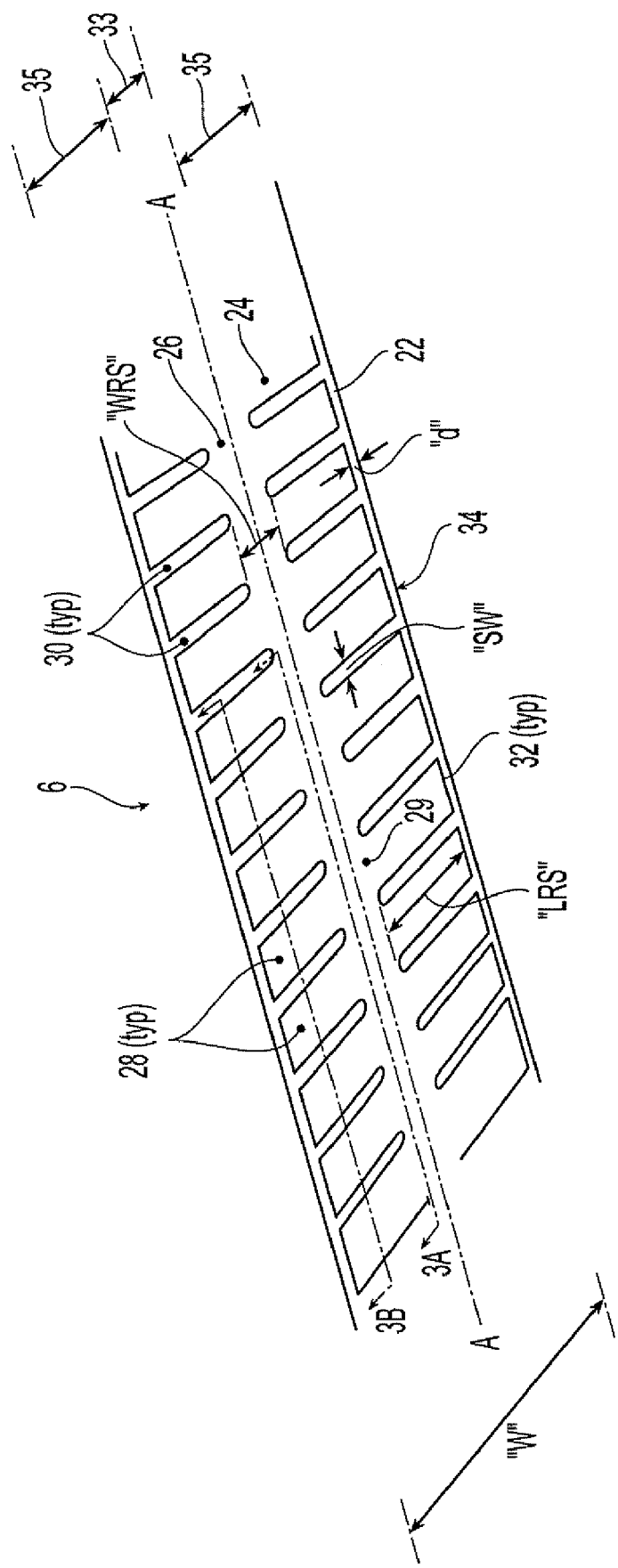
FIG. 2 is an isometric view of a portion of an exemplary conveyor belt design for use with the articulated conveyor system of FIG. 1.

Referring to FIG. 2, a portion of an exemplary conveyor belt 6 for use with conveying system 1 is shown comprising a first elastomer layer 22 and a central reinforcing layer 24. The first elastomer layer 22 may comprise a substantially continuous layer of elastomer material having a longitudinal axis A-A that is oriented along the longitudinal axis of the conveyor belt 6. The central reinforcing layer 24 may comprise a central reinforcing strip 26 disposed over the first elastomer layer 22 and may have a longitudinal axis B-B substantially aligned with axis A-A of the first elastomer layer 22. The central reinforcing layer 24 may further comprise a plurality of lateral reinforcing strips 28 each having a first end 29 associated with the central reinforcing strip 28 and a second end 32 disposed adjacent to a side edge 34 of the first elastomer layer 22. As can be seen, the second ends 32 of the lateral reinforcing strips 28 terminate a first distance "d" inward from the side edge 34 of the first elastomer layer 22 to facilitate molding of the side edge, as will be discussed in greater detail later.

The lateral reinforcing strips 28 may be spaced apart from immediately adjacent strips to form a series of slots 30 each having a slot width "SW." Thus, a segmented reinforcing arrangement may be formed having a continuous layer of reinforcement disposed along a central portion 33 of the conveyor belt 6, and a discontinuous layer of reinforcement along the side portions 35 of the belt 6. In this manner, a belt having a varying flexibility across its width "W" can be formed. This varying flexibility is expected to provide a belt having enhanced resistance to tearing, and greater resistance to fastener pull-out, as compared to current belts, thus increasing the life of the belt when subjected to extreme in-plane bending.

For purposes of illustration, FIG. 2 shows only a single elastomer layer (first elastomer layer 22). It will be appreciated that a second elastomer layer 36 will typically be provided over the central reinforcing layer 24, (see, e.g., FIGS. 3A, 3B), to provide a belt structure in which the reinforcing layer is sandwiched between opposing elastomer layers. Additionally, multiple additional reinforcing and elastomer layers may also be provided as desired.

Any of a variety of natural or synthetic elastomeric materials suitable for conveyor belt applications may be used to form the first and second elastomer layers 22, 36. A non-limiting list of exemplary materials includes chloro-sulfonyl-polyethylene, natural rubber, chloroprene, nitrile-butadiene rubber, butadiene rubber, isoprene, styrene-butadiene, modified polysiloxanes, polyester urethane, polyether urethane, polyvinyl chloride, fluorocarbon polymers, and the like. In a preferred embodiment, the elastomeric material comprises natural rubber.

The elastomeric material may also comprise additives for enhancing flame retardancy, wear and chunk resistance, rolling resistance, aging resistance (e.g., ozone and UV resistance), and the like. Vulcanization aids, cross-linking agents, oils, accelerators, or other formation aids may also be used.

Similarly, the central reinforcing layer 24 may be formed from any of a variety of materials, either woven or non-woven, and in any desirable weight and orientation. Such materials may include a wide variety of synthetic and man-made fibers, including polyester, nylon, aramid (e.g., Kevlar), glass, polypropylene, cellulose, wool, or others. The fibers may be multi-filament, monofilament, or staple fibers. In one embodiment, the central reinforcing layer 24 may comprise a single ply of polyester or nylon, US Flex®, manufactured by Fenner-Dunlop, Scottdale, Ga. Additionally, the central reinforcing layer 24 can be comprised of a single ply of reinforcing material, or it can comprise multiple individual plies separated by appropriate elastomeric or adhesive layers.

Figure 4:
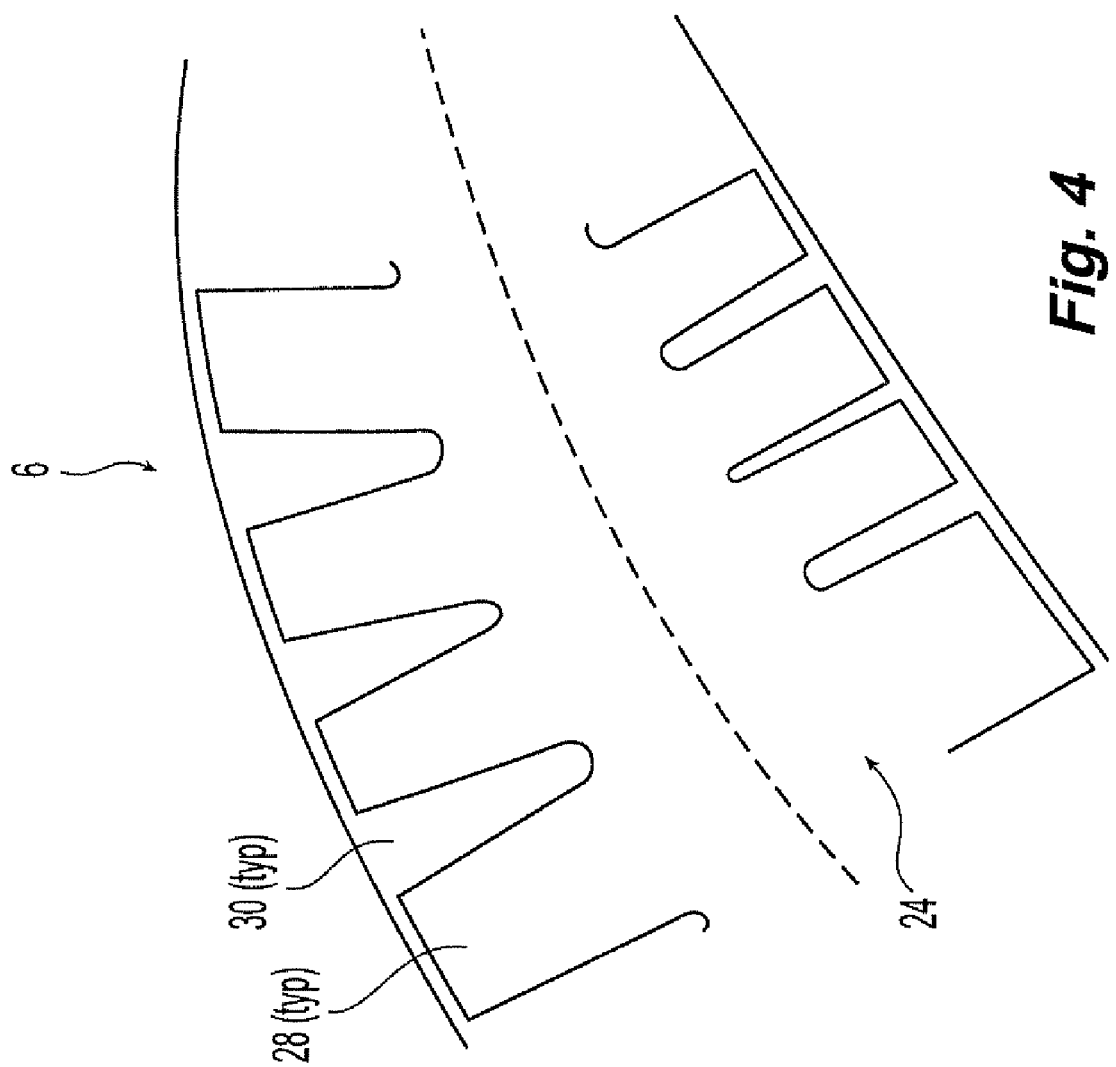
FIG. 4 is a partial plan view of the belt of FIG. 2 flexing in response to in-plane loading.

FIG. 3A is a cross-sectional view showing the reinforcement arrangement for the central portion 33 (FIG. 2) of the conveyor belt 6, including continuous central reinforcing strip 26 disposed between first and second elastomer layers 22, 36. FIG. 3B shows the reinforcing scheme for side portions 35 (FIG. 2) of the belt 6, clearly illustrating the segmented reinforcement provided by the lateral reinforcing strips. During manufacture, the elastomer material used to form the first and second elastomer layers 22, 36 will flow together to provide a continuous thickness of elastomeric material in the slots 30 between the adjacent lateral reinforcing strips 28. It is these un-reinforced slots that permit the conveyor belt 6 to stretch advantageously at the side edge 34 when the belt is forced to move through one of the tight corners of the flexible conveyor system. This flexing is illustrated in FIG. 4, in which it can be seen that the slots 30 effectively "open up" at the side edge 34 when the conveyor belt 6 is subjected to in-plane bending. This flexibility enables the belt 6 to more closely conform to the curvature of the conveyor system, and to do so with less overall stress on the belt as compared to prior belts.

Referring to FIG. 5A, central reinforcing layer 24 is shown having central reinforcing strip 26 and a plurality of lateral reinforcing strips 28. Each of the lateral reinforcing strips 28 may have an axis C-C oriented substantially perpendicular to the axis B-B of the central reinforcing layer 26 and to the axis A-A of the conveyor belt 6. In one embodiment, the material used to form the central reinforcing layer 26 may be oriented so that the running direction of the fabric used for the central reinforcing layer 26 is 90-degrees from the running direction of the belt 6. Alternatively, the fabric may be oriented at a variety of angles with respect to the running direction of the belt 6. For example, the fabric could be oriented on its bias (i.e., running direction of the fabric oriented at 45-degrees from the running direction of the belt.) As will be appreciated, various different orientations of the fabric of the central reinforcing layer 26 may be used to provide a desired strength and flexibility of the finished belt 6.

The central reinforcing strip 26 or strips may have a width "WRS" that is from about ½-inch to about 12 inches, and preferably is about 6 inches. The central reinforcing strip 26 is preferably centered on the centerline of the conveyor belt such that axes A-A (FIG. 2) and B-B are collinear.

The lateral reinforcing strips 28 each may have a length "LRS" and a width "WLRS." As previously mentioned, the length LRS of the lateral reinforcing strips 28 typically will be selected so that the second ends 32 of the strips 28 do not extend to the side edges 34 of the flexible elastomer layer 22. This enables the provision of a molded side edge of from about ¼ inch to about 1½ inches. In one embodiment, a molded side edge of about ⅜ inch width may be provided. The molded side edge may act to prevent ingress of water between the material layers, and also to absorb impact and improve edge wear. The slots 30 may each have a slot width "SW" of from about ½-inches to about 12-inches, and are preferably about ½-inch. It is noted that the slots 30 shown in FIG. 2 have a constant width "SW" since the lateral reinforcing strips 28 are generally rectangular in shape. For embodiments in which the lateral reinforcing strips are tapered (see FIGS. 8A and 8B), the slot width "SW" will vary along the length "LRS" of the associated strips 28. Thus, for embodiments in which tapered reinforcing strips are used, the slot width "SW" may vary from about ½-inches (at the intersection with the central reinforcing strip 26) to as much as 12-inches (adjacent the second ends 32 of the strips).

As can be seen throughout the figures, the intersection 38 between the central reinforcing strip 26 and the slots 30 may comprise a rounded geometry to reduce stress concentrations at the intersection, thereby minimizing the chance that rips or tears in the reinforcing material will occur. In one embodiment, the radius of curvature of the intersection 38 may be about ¼-inch.

FIG. 5B shows an alternative embodiment of a central reinforcing layer 24 in which the lateral reinforcing strips 28 are each oriented at an oblique angle α with respect to the longitudinal axis B-B of the central reinforcing strip 26. In the illustrated embodiment, the lateral reinforcing strips 28 are oriented so as to assume a chevron configuration, the strips being swept back away from the ultimate direction of movement "A" of the belt 6 along the conveyor. The angle α may be about 45 degrees to about 80 degrees, and in one preferred embodiment is about 45 degrees. This angled configuration is expected to provide increased resistance to tearing as compared to the arrangement of FIG. 5A, since a lateral tear would be required to traverse one or more reinforcement layers in its path to the center of the belt, or would otherwise be required to proceed at an angle along the slot. The angled or "chevron" oriented lateral reinforcing strips 28 are also expected to provide better load support as compared to the embodiment of FIGS. 2 and 5A.

In some applications it may be preferable to provide additional reinforcement layers to the conveyor belt 6 in order to enhance the overall structural integrity of the belt. In one embodiment, shown in FIGS. 6A and 6B, a plurality of continuous reinforcement layers 40, 42 may be provided above and below the central reinforcing layer 24. FIG. 6A is a longitudinal cross-section of the central portion 33 of the belt 6, while FIG. 6B is a longitudinal cross-section of one of the side portions 35 of the belt 6.

The additional continuous reinforcement layers 40, 42 may provide stable lateral support for the belt, particularly in the regions of the slots 30. The layers 40, 42 also serve to protect the interior carcass (i.e., the central reinforcing layer 24) from damage due to impact with the transported material. The layers additionally aid in mechanical fastener holding performance of the belt. These continuous reinforcement layers 40, 42 may be made from light weight fabric or other material that is capable of stretching with the elastomeric material in the slots 30, so as not to substantially hinder the function of the slots 30. These continuous reinforcement layers 40, 42 may be separated from the central reinforcing layer 24 by respective intermediate elastomer layers 44, 46. The continuous reinforcement layers 40, 42, unlike the central reinforcing layer 24, may be free of slots or cuts, and thus may be designed to take the full flex of the belt 6 as it moves around the curves 4 of the flexible conveyor system 1. In one embodiment, the continuous reinforcement layers 40, 42 may be oriented such that the greatest strength and stiffness of the fabric is aligned with the longitudinal axis A-A of the conveyor belt 6. Alternatively, the continuous reinforcement layers may be formed from fabric cut on or near the bias so that the greatest flexibility is aligned with the longitudinal axis A-A of the belt 6, while providing the greatest strength and stiffness across the width of the belt.

The first and second continuous reinforcement layers 40, 42 may be made of any appropriate fabric or other material, either woven or unwoven, and in any desirable weight and orientation, suitable for providing the desired structural and flexural properties. A desirable material is one having a low modulus of elasticity and good puncture resistance so as to protect the central reinforcing layer 24 from impact damage caused by the carried material. The material should also exhibit good bonding to the first and second elastomer layers 22, 36. Preferably, the material will be compatible with the processes and materials used to form the conveyor belt 6 to enable low cost production of the finished belt. The material used to form the first and second continuous reinforcing layers 40, 42 may comprise a "leno", plain, twill or basket weave fabric. The weave may be open or tightly woven. Additionally, the fiber may either be in loom state, or it may be treated with Resorcinol Formaldehyde Latex (RFL) or other elastomeric latex treatment.

In one embodiment, the first and second continuous reinforcement layers 40, 42 comprise a light weight breaker fabric of from about 5 to about 14 ounces per yard, such as a single layer leno weave fabric having a weight of from about 6 to about 12 ounces per yard. A substantial benefit of using a leno weave or other open weave fabric is that the material used for the elastomer layers can penetrate the fabric's open weave to impregnate the reinforcing layers 40, 42 with elastomer, thus providing tight integration of the elastomer and reinforcing layers.

Suitable materials for use as the continuous reinforcement layers may be the same as the materials previously described for use as the central reinforcing layer 24. Additionally, although the reinforcement layers 40, 42 are each illustrated as being single layers of materials, the layers 40, 42 each may alternatively be made up of multiple fabric layers.

Although the conveyor belt 6 has been described thus far with reference to a single-ply central reinforcing layer 24, it will be appreciated that the belt 6 may be fabricated in a multi-ply form. Thus, FIGS. 7A and 7B show a further embodiment in which the central reinforcing layer 24 comprises a two-ply configuration, with first and second plies 24A, 24B spaced apart by an intermediate layer of elastomeric material 48. FIG. 7A is a longitudinal cross-section of the central portion 33 of the belt 6, while FIG. 7B is a longitudinal cross-section of one of the side portions 35 of the belt 6. The first and second plies 24A, 24B each may have corresponding central reinforcing strips 26A, 26B and lateral reinforcing strips 28A, 28B as previously described in relation to FIGS. 1A-6B. The central and lateral reinforcing strips 26A, B; 28A, B may be cut so that the slots 30A, 30B formed between the lateral reinforcing strips 28A, 28B align between the plies when the belt 6 is fabricated. Alternatively, it is contemplated that the geometries of the plies may be different to provide a belt with desired flexibility and strength properties. For example, it may be possible to provide a first ply having a strip geometry similar to that described in relation to FIG. 2. The second ply, however, may comprise a central reinforcing strip 26B (corresponding in width to the central reinforcing strip 26A of the first ply) but without any lateral reinforcing strips, or with greater or fewer reinforcing strips than the first ply.

Further, where multiple plies 26A, B are used to form the central reinforcing strip, the bias orientation of the fabric used for each ply could be different. Additionally, each ply could be made from a different fabric weight and/or weave design. Providing different bias orientations may result in a central reinforcing layer that readily troughs or flexes in one direction, but which resists flexure in another direction.

The lateral reinforcing strips 28 may be of the same or fewer plies as compared to the central reinforcing strip 26. Likewise, the lateral reinforcing strips 28 can be the same or different material compared to the central reinforcing strip 26, and/or can have different fabric orientations.

Additionally, the lateral reinforcing strips 28 may be integral with the central reinforcing strip 26 (i.e., cut or stamped from a single piece of material), or they may be formed separate from the central reinforcing strip 26. If they are formed separate from the central reinforcing strip 26, the lateral strips 28 may be joined to the central strip using any appropriate technique known in the art. Alternatively, they may be left un-joined to the central reinforcing strip 26. Such an arrangement would allow the use of, for example, a woven central reinforcing strip 26 in combination with nonwoven lateral strips 28.

It will be appreciated that the lateral reinforcing strips 28 of the central reinforcing layer 24 may be any length and width desired, and may be sized to provide slots having any desired shape and width, including slot widths "SW" that vary across the width W of the belt 6. Additionally, the lateral reinforcing strips 28 can be provided in a variety of geometric configurations.

Figure 8A:
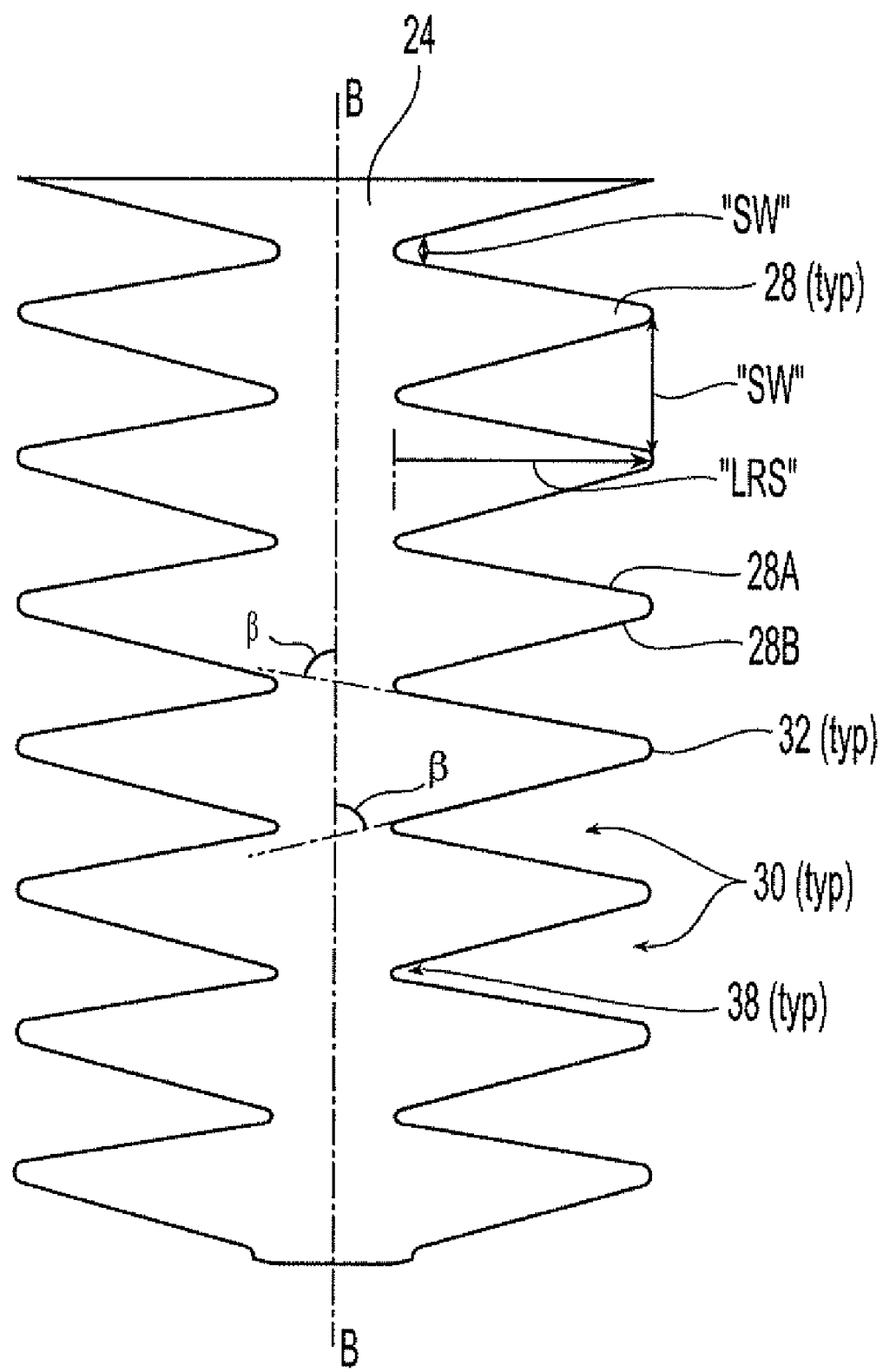
FIGS. 8A and 8B are top plan views of alternative reinforcing layers for use with the inventive conveyor belt.

FIG. 8A shows a central reinforcing layer 24 with lateral reinforcing strips 28 each having a symmetric tapered or coned configuration, such that the slot width "SW" varies along the length "LRS" of the lateral reinforcing strips 28. In this embodiment, the first and second sides 28A, 28B of each strip 28 form an oblique angle β with the longitudinal axis B-B of the central reinforcing strip.

The second ends 32 of each lateral reinforcing strip 28 is rounded, as are the intersections 38 between the central reinforcing strip 26 and the slots 30, to minimize resulting stress concentrations, thereby minimizing the chance that rips or tears in the belt and reinforcing material may occur. In one embodiment, the radius of curvature of the rounded second ends 32 and of the intersections 38 may be about ¼-inch.

Figure 8B:
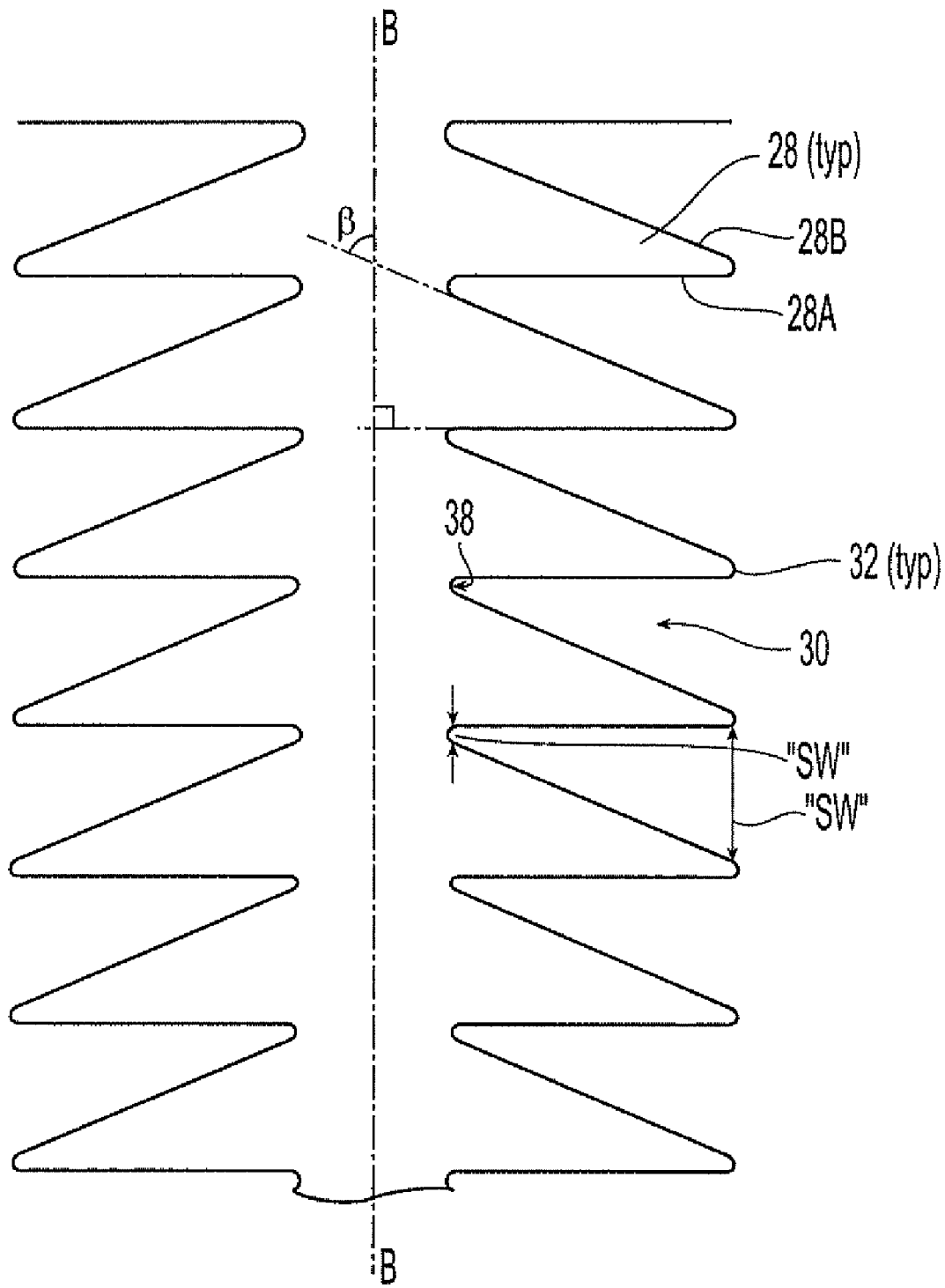

FIG. 8B shows yet another embodiment in which the lateral reinforcing strips 28 have an asymmetric tapered or coned configuration. In the illustrated embodiment, one side 28A of each strip 28 (the trailing side) is substantially perpendicular to the longitudinal axis B-B of the central reinforcing strip 26 and a second side 28B (the leading side) forms an oblique angle β with respect to axis B-B. Again, the second ends 32 of the lateral reinforcing strips are rounded, as are the intersections 38 between the slots 30 and the central reinforcing strip 26.

It is contemplated that the central reinforcing layer 24 may be provided with slots only on one side of the central reinforcing strip 26, or may have different sized and/or shaped slots on opposite sides of the central reinforcing strip. Likewise, different size/shaped slots could be provided in alternating fashion along the length of the belt 6. Thus, a combination of different shaped (e.g., rectangular and tapered) lateral reinforcing strips 28 may be provided in a single run of belt 6. Also, a combination of different sized reinforcing strips 28 may also be provided.

Additional outer cover materials may also be applied to the exterior surfaces of the first and second elastomer layers 22, 36. Additionally, texturing or other surface treatments or configurations may also be implemented as desired.

EXAMPLE 1

In a first example, a flexible conveyor belt was constructed in a 37" width, with the following configuration:
 (1) Top and bottom covers—125 mil thickness each of rubber compound;
 (2) First and second continuous reinforcement layers—34 mil thickness each of 7½ ounce per yard nylon leno weave fabric, RFL treated;
 (3) First and second plies of central reinforcement—68 mils each of 25 ounce per yard plain weave nylon fabric, RFL treated;
 (4) Between-ply elastomer—63 mil thickness each of rubber compound.

The overall gauge of the belt was 875 mil. Between-ply elastomer was disposed between each reinforcement layer, including the first and second plies of central reinforcement. The first and second plies of central reinforcement had open slots cut widthwise starting at 3" each side from the centerline and extending to the ply edge. Slots were 1-inch wide and spaced 6 inches apart center-to-center. The starting point of the slots were rounded. After slots were cut, a 6" strip remained down the center. First and second continuous reinforcement layers were continuous and were wrapped around each side edge of the belt with an approximate ⅜" solid cap at each side edge. The belt sample was subjected to load support testing, modulus testing and tensile strength testing in accordance with ASTM-D378.

Dynamic flex fatigue testing, designed to simulate the dynamic loading conditions experienced by a conveyor belt during operation, was also performed to compare belt fatigue and mechanical fastener holding capability of the example test belt sample with a standard belt sample taken from a belt typically used in flexible conveyor train applications. Testing was performed using reduced size (24-inch width) pilot conveyor test belts, with one belt fabricated from the standard belt sample, and the other belt fabricated from the example test belt sample. The test was run on both belt samples for about 4 hours, until the standard belt sample failed (i.e., lost fastener lacings). No such failure was observed with the example test belt sample.

EXAMPLE 2

In a second example, a flexible conveyor belt was constructed in a 37" width, with the following configuration:
(1) Top and bottom covers—125 mil thickness each of rubber compound;
(2) First and second continuous reinforcement layers—34 mil thickness each of 25 ounce per yard nylon leno weave fabric, RFL treated;
(3) Single ply of central reinforcement-160 mil thickness straight warp fabric, about 90 ounce per yard, RFL treated;
(4) Between-ply elastomer—199 mil thickness each of rubber compound.

The overall gauge of the belt was approximately 875 mil. The single ply of central reinforcement had open slots cut widthwise starting at 3" each side from the centerline and extending to the ply edge. Slots were 1-inch wide and spaced 6 inches apart center-to-center. The starting points of the slots were rounded. After slots were cut, a 6" strip remained down the center. First and second continuous reinforcement layers were continuous and were wrapped around each side edge of the belt with an approximate ⅜" solid cap at each side edge.

The belt sample was subjected to load support testing, modulus testing and tensile strength testing in accordance with ASTM-D378.

Dynamic flex fatigue testing, designed to simulate the dynamic loading conditions experienced by a conveyor belt during operation, was also performed to compare belt fatigue and mechanical fastener holding capability of the example test belt sample with a standard belt sample taken from a belt typically used in flexible conveyor train applications. Testing was performed using reduced size (24-inch width) pilot conveyor test belts, with one belt fabricated from the standard belt sample, and the other belt fabricated from the example test belt sample. The test was run on both belt samples for about 4 hours, until the standard belt sample failed (i.e., lost fastener lacings). No such failure was observed with the example test belt sample.

A method of making a conveyor belt 6 in accordance with the above described design ma comprise cutting or stamping the central reinforcement layer 24 from a sheet or sheets of woven reinforcing material. The cutting or stamping step may form the slots 30, and also may provide the central reinforcement layer with an overall width that is slightly smaller than the width of the finished belt, to thereby allow the formation of molded side edges.

The central reinforcing layer 24 may then be treated with an RFL composition to facilitate bonding between the reinforcing layer and the first and second elastomer layers 22, 36. One or both of the first and second elastomer layers 22, 36 may then be applied either by pressing or calendaring. The first and second elastomer layers 22, 35 may be applied to the central reinforcing layer 24 in a single step, or in successive steps.

Where additional reinforcement layers 40, 42 are used, additional pressing and/or calendaring steps may be used to apply the requisite additional layers of elastomer 44, 46, 50 and reinforcement.

It will be understood that the description and drawings presented herein represent an embodiment of the invention, and are therefore merely representative of the subject matter that is broadly contemplated by the invention. It will be further understood that the scope of the present invention encompasses other embodiments that may become obvious to those skilled in the art, and that the scope of the invention is accordingly limited by nothing other than the appended claims.

The invention claimed is:

1. A flexible reinforced structure, comprising:
a first elastomeric layer having a surface;
a first reinforcing layer having a first major surface and a second major surface, said first major surface being disposed over said surface of said first elastomeric layer; and
a second elastomeric layer, said second elastomeric layer being disposed over the second major surface of the first reinforcing layer,
wherein said first reinforcing layer comprises a central section and a plurality of longitudinally spaced lateral sections having a first end associated with said central section and a second end spaced a distance away from said central section.

2. The flexible reinforced structure of claim 1, further comprising second and third reinforcing layers, the second reinforcing layer being disposed between the first reinforcing layer and the first elastomeric layer, and the third reinforcing layer disposed between the second reinforcing layer and the second elastomeric layer.

3. The flexible reinforced structure of claim 2, further comprising a third elastomeric layer disposed between the first and second reinforcing layers and a fourth elastomeric layer disposed between the first and third reinforcing layers.

4. The flexible reinforced structure of claim 2, wherein at least one of the first, second and third elastomeric layers comprises rubber.

5. The flexible reinforced structure of claim 2, wherein the first reinforcing layer comprises woven polyester, and the second and third reinforcing layers comprise woven polypropylene.

6. The flexible reinforced structure of claim 2, wherein the second and third reinforcing layers are each substantially in the form of an unbroken sheet, to thereby engage substantially the entire associated surface of the first and second elastomeric layers, respectively.

7. A flexible reinforced structure, comprising:
first and second elastomeric layers;
a first reinforcing layer disposed between said first and second elastomeric layers, said first reinforcing layer having a longitudinally-oriented central section, and a plurality of spaced-apart laterally-oriented sections, each of said laterally-oriented sections being spaced a distance from immediately adjacent ones of said plurality of laterally-oriented sections as measured along a longitudinal axis of said flexible reinforced structure.

8. The flexible reinforced structure of claim 7, wherein the plurality of longitudinally spaced lateral sections each has a first end associated with said central section and a second end spaced a distance away from said central section.

9. A method of making a flexible reinforced structure, comprising:
providing first and second elastomeric layers;
providing a first reinforcing layer having a central longitudinal section and a plurality of laterally-disposed sections, the central longitudinal section being substantially aligned with a longitudinal axis of said flexible reinforced structure, the plurality of laterally-disposed sections each having an axis that is substantially non-parallel to said longitudinal axis of said flexible reinforced structure; and
adhering said first and second elastomeric layers to said first reinforcing layer.

10. The method of claim 9, wherein the step of providing a first reinforcing layer comprises cutting said central longitudinal section and said plurality of laterally-disposed sections from a single sheet of reinforcing material.

11. The method of claim 9, wherein the step of adhering said first and second elastomeric layers to said first reinforcing layer comprises a calendaring process.

12. The method of claim 11, wherein the first and second elastomeric layers are adhered to said first reinforcing layer in a single calendaring step.

13. The method of claim 9, wherein the step of adhering said first and second elastomeric layers to said first reinforcing layer comprises a laminating process.

14. The method of claim 9, further comprising:
   providing a second reinforcing layer having a central longitudinal section and a plurality of laterally-disposed sections, the central longitudinal section being substantially aligned with a longitudinal axis of said flexible reinforced structure, the plurality of laterally-disposed sections each having an axis that is substantially non-parallel to said longitudinal axis of said flexible reinforced structure; and
   adhering a third elastomeric layer between the first and second reinforcing layers.

15. The method of claim 14, wherein the first and second reinforcing layers are comprised of the same material.

16. The method of claim 9, further comprising:
   providing a first continuous reinforcing layer between said first reinforcing layer and said first elastomeric layer; and
   providing a second continuous reinforcing layer between said first reinforcing layer and second elastomeric layer.

17. The method of claim 16, wherein said first and second continuous reinforcing layers extend across substantially the entire width of the flexible reinforced structure.

18. The method of claim 16, further comprising providing a third elastomeric layer between said first continuous reinforcing layer and said first reinforcing layer, and providing a fourth elastomeric layer between said second continuous reinforcing layer and said first reinforcing layer.

\* \* \* \* \*